June 5, 1934.  C. S. HAZARD  1,961,688
SEALING PIN FOR OSCILLATING PISTON CHAMBERS
Filed Feb. 25, 1933
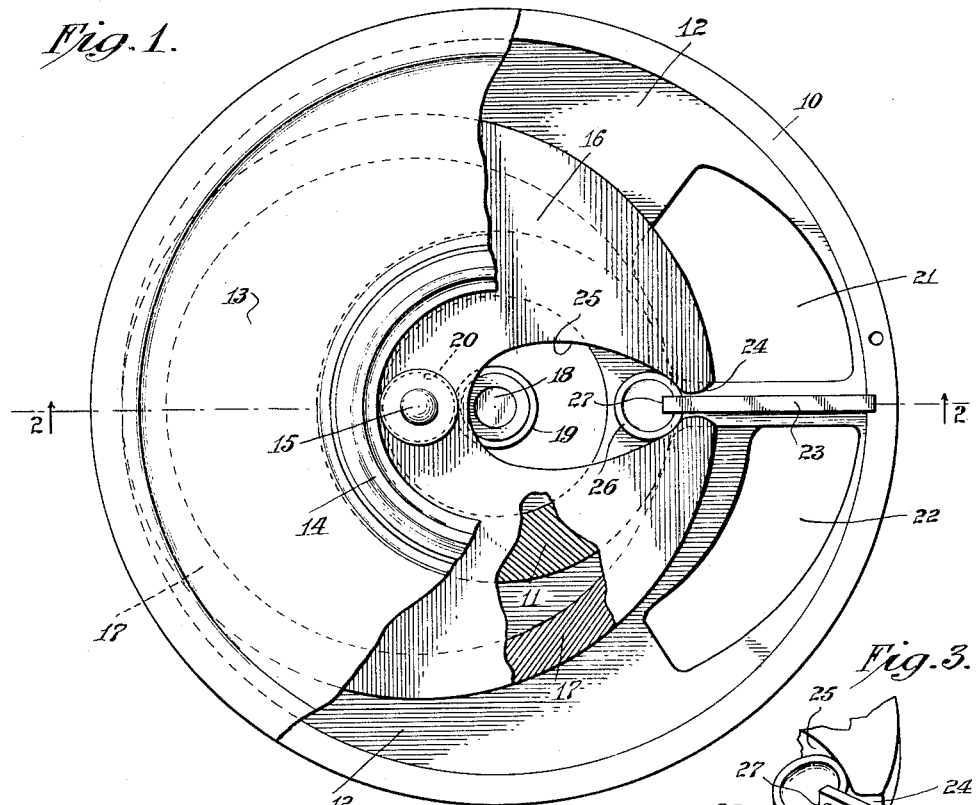
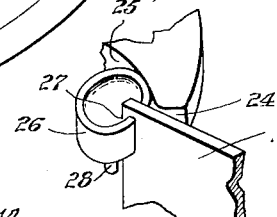
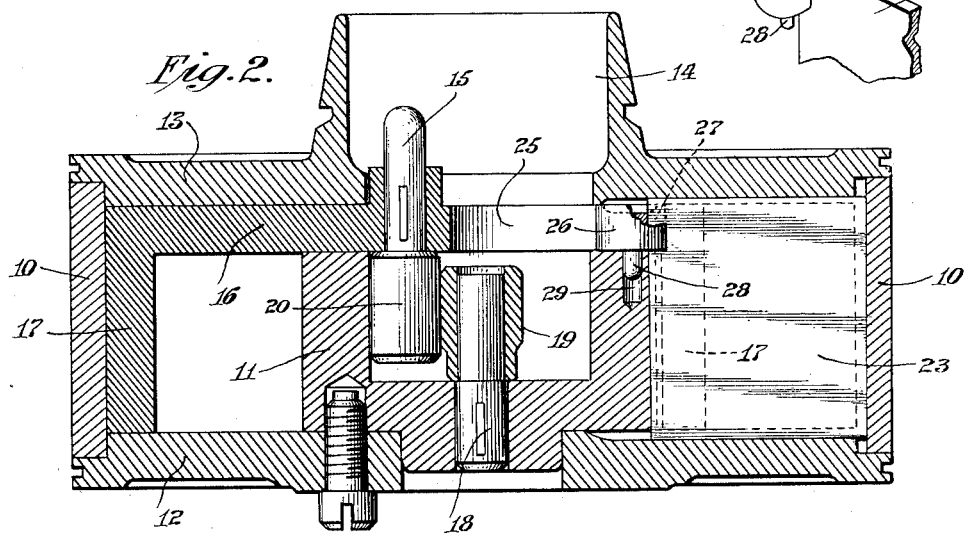
INVENTOR
Charles S. Hazard
BY
Redding, Greeley, O'Shea & Campbell
ATTORNEYS Patented June 5, 1934

1,961,688

UNITED STATES PATENT OFFICE 1,961,688

SEALING PIN FOR OSCILLATING PISTON CHAMBERS

Charles S. Hazard, Flushing, N. Y., assignor to Neptune Meter Company, New York, N. Y., a corporation of New Jersey Application February 25, 1933, Serial No. 658,567

3 Claims. (Cl. 73—37)

The present invention relates to fluid meters of the oscillating piston type and embodies, more specifically, an oscillating piston fluid meter formed with a piston chamber having an improved means for sealing, effectively, the connection between the oscillating piston and the partition. Existing structures have a pin or lug formed on the partition and adapted to be engaged by the piston to seal the connection between the piston and partition during such times in the movement of the piston that the greatest leakage would occur around the partition. This leakage occurs, of course, by reason of the slot formed in the piston to receive the partition, the slot of necessity being wider than the thickness of the partition to permit the oscillation of the piston within the meter chamber. In the existing constructions, the sealing pin is formed on the partition and serves as a means for effectively sealing the slot formed in the piston when the space between the edges of the slot and the sides of the partition is the greatest.

In order that existing meters may be manufactured and assembled with greater facility, the present invention provides an improved sealing connection between the oscillating piston and the partition in the piston chamber. This connection is of such character that the parts may be manufactured and assembled with facility, the sealing pin being formed in such fashion that it may be readily mounted upon the inner stationary cylindrical member which defines the inner wall of the metering chamber.

An object of the invention, accordingly, is to provide an improved form of oscillating piston meter having a sealing pin adapted to cooperate with the partition thereof to seal, effectively, the space between the piston and partition, the connection being of such character that the meter may be readily manufactured and assembled.

A further object of the invention is to provide an improved oscillating piston meter having a sealing connection adapted to cooperate with the meter partition to seal, effectively, the space between the partition and piston, the connection being mounted upon the inner cylindrical chamber wall.

Further objects, not specifically enumerated above, will be apparent as the invention is described in greater detail in connection with the accompanying drawing, wherein:

Figure 1 is a plan view of an oscillating piston meter provided with a sealing connection constructed in accordance with the present invention, the top of the meter and a portion of the piston being broken away in order that the meter elements may be illustrated more clearly.

Figure 2 is a view in section, taken on line 2—2 of Figure 1, and looking in the direction of the arrows.

Figure 3 is a view in isometric projection showing a portion of the meter in Figures 1 and 2, such portion including the sealing connection constructed in accordance with the present invention.

With reference to the above drawing, an oscillating piston meter is shown as having an outer cylindrical wall 10 and an inner cylindrical wall 11, the cylindrical members being mounted upon a common base member 12. A top plate 13 is provided and formed with a sleeve 14 through which a driving connection may pass to a driving stud 15. The driving stud is mounted upon a piston 16 which is formed with a cylindrical skirt 17, adapted to fit snugly between the top plate 13 and bottom member 12.

A stationary stud 18 is centered within the cylindrical member 11 and provided with a roller 19, the stud 15 extending downwardly into the interior of the cylindrical member 11 and being provided with a roller 20 which has a proper working fit between the roller 19 and the inner surface of the hollow cylindrical member 11. Inlet and outlet apertures 21 and 22 are formed in the bottom plate 12 upon opposite sides of a partition 23 which is suitably secured in grooves formed within the top and bottom plates 12 and 13 and the outer cylindrical wall 10. The partition 23 is received within a slot 24 formed in the skirt 17 of the piston 16, the piston 16 being cut away as shown at 25 to permit oscillating movement of the piston within the meter chamber with appropriate reciprocating motion of the piston slot 24 over the partition 23.

As is well known in meters of this construction, appreciable leakage takes place about the partition 23 when the piston is in the position shown in Figures 1 and 2 by reason of the space between the edges of the slot 24 and the adjacent sides of the partition 23. Such leakage in structures of the type above described has heretofore been decreased by the provision of a lug on the partition 23.

In accordance with the present invention, the sealing member is mounted upon the cylindrical member 11 and comprises a sealing pin or lug 26 formed with a slot 27. Slot 27 is of a width equal to the thickness of the partition 23 and receives the upper edge thereof, as clearly shown in the drawing.

Upon the pin 26 is a positioning stud 28 which projects downwardly therefrom and is adapted to be received within a recess 29 formed in the inner cylindrical member 11. In this fashion, the inner and outer cylindrical walls and partition 23 may be assembled upon the bottom plate 12 and the piston 16 inserted within the metering chamber, after which the sealing connection comprising the pin 26 and stud 28 may be mounted in the position shown in Figure 2. Such construction greatly facilitates the manufacture and assembly of meters of this character and has been found to provide a far more desirable meter construction.

It will be seen that leakage around the partition 23 in the plane of the top 16 of the piston and between the walls of the partition 23 and the spaced sides of the grooves 24 will be prevented by the pin 26 in all positions of the piston. Greatest leakage would occur, of course, when the piston is in the position shown in Figures 1 and 2 in as much as at that time the greatest space occurs between the sides of the slot 24 and the partition 23. In intermediate positions of the piston between the position shown in Figure 1 and the position wherein the roller 20 is on the other side of roller 19 the curved side of the pin 26 engages some portion of the curved wall 25 of the slot formed in the top 16 and prevents the flow of fluid around the partition.

While the invention has been described with specific reference to the accompanying drawing, it is not to be limited, save as defined in the appended claims.

I claim as my invention:

1. An oscillating piston meter having a metering chamber formed by an outer wall and a stationary inner cylindrical member forming the inner wall thereof, a partition extending across and forming a sealing partition in the chamber, a sealing member formed with a recess to receive a portion of the partition, means to mount the sealing member removably upon the inner stationary cylindrical member, and a slotted piston in the chamber.

2. An oscillating piston meter having a metering chamber formed by an outer wall and a stationary inner cylindrical member forming the inner wall thereof, a partition extending across and forming a sealing partition in the chamber, a sealing member formed with a recess to receive a portion of the partition, and a pin on the sealing member substantially parallel to the recess, said inner stationary cylindrical member having a recess to receive the pin, whereby the sealing member may be removably mounted upon the said inner cylindrical member with the recess thereof engaging the partition, the sealing member being assembled by movement thereof on the adjacent portion of the partition, whereby the pin moves into the recess in the inner stationary cylindrical member and a slotted piston in the chamber between the cylindrical members, the slot of the piston receiving the partition therein.

3. As an article of manufacture a sealing member for oscillating piston meters having a recess to engage a meter partition, and a pin on the member adapted to engage a recess in the meter to secure the member removably therein.

CHARLES S. HAZARD.